(12) United States Patent
Erickson et al.

(10) Patent No.: US 7,739,228 B1
(45) Date of Patent: *Jun. 15, 2010

(54) METHOD OF GENERATING A SERVICES REPOSITORY USING A TARGET SERVICES ROADMAP

(75) Inventors: Richard R. Erickson, Farmingdale, NJ (US); Steven Polston, Flemington, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 11/275,228

(22) Filed: Dec. 20, 2005

(51) Int. Cl.
*G06F 7/00* (2006.01)
(52) U.S. Cl. ..................................... 707/602
(58) Field of Classification Search ....................... 707/3
See application file for complete search history.

(56) References Cited

U.S. PATENT DOCUMENTS

| | | | |
|---|---|---|---|
| 6,526,526 B1 | 2/2003 | Dong et al. | |
| 7,035,944 B2 | 4/2006 | Fletcher et al. | |
| 7,089,237 B2 | 8/2006 | Turnbull et al. | |
| 7,181,536 B2 | 2/2007 | Burbeck et al. | |
| 7,188,155 B2 | 3/2007 | Flurry et al. | |
| 7,343,428 B2 | 3/2008 | Fletcher et al. | |
| 2002/0103789 A1* | 8/2002 | Turnbull et al. ................. 707/3 |
| 2002/0120685 A1 | 8/2002 | Srivastava et al. | |
| 2003/0055624 A1* | 3/2003 | Fletcher et al. ................. 704/2 |
| 2003/0055878 A1* | 3/2003 | Fletcher et al. .............. 709/203 |
| 2004/0139151 A1 | 7/2004 | Flurrey et al. | |
| 2004/0201611 A1 | 10/2004 | Bagsby | |
| 2005/0038708 A1 | 2/2005 | Wu | |
| 2005/0125408 A1 | 6/2005 | Somaroo et al. | |
| 2005/0160434 A1* | 7/2005 | Tan et al. ..................... 719/331 |
| 2005/0198333 A1* | 9/2005 | Dinges et al. ............... 709/229 |
| 2006/0235733 A1 | 10/2006 | Marks | |
| 2007/0112574 A1* | 5/2007 | Greene .......................... 705/1 |

OTHER PUBLICATIONS

Michael Champion et al., Web Services Architecture, Nov. 14, 2002, W3C Working Draft, 1-47.

* cited by examiner

*Primary Examiner*—Charles Rones
*Assistant Examiner*—Fazlul Quader

(57) ABSTRACT

A repository of services, a system for building a repository of services, a method of building a repository of services and various other embodiments associated with the repository are disclosed. The method relates to a method of building a repository of services using a target services roadmap. The method comprises receiving from a user an identification of an implemented service and zero or more target services and mapping the implemented service to the zero or more target services. The target services and/or mapped implemented services are added to the repository.

35 Claims, 10 Drawing Sheets

FIG. 3

| Home | Search | Publish | Admin. |

Search Results for Service ⓘ — 302

| Service ID | Service Name | Service Description | EA Domain | EA Domain Subgroup | Host OSS System | |
|---|---|---|---|---|---|---|
| 304 | 306 | 308 | 310 | 312 | 314 | 316 |
| 3F8455B003B211DA9580A72F16DCD32E | Activity | Operations to retrieve, create and update Activities and activity details | Data Access | CSI: Customer Service Inventory | DBOR | View |
| 88D74DC00042A11DA8DC0A9FD50BE2013 | Contact | Operations to retrieve, create and update Customer contact(s) and associated contact details | Data Access | CSI: Customer Service Inventory | DBOR | View |
| F5AAC18003701IDA8180F35783299700 | Customer Location | Operations to retrieve, create and update customer locations and site information | Data Access | CSI: Customer Service Inventory | DBOR | View |
| 3D22E3F0006311DAA5F081FACDAD5ED7 | Product Instance | Operations to get, set and update Product and Component Instance | Data Access | CSI: Customer Service Inventory | DBOR | View |
| 30618470004D11DA847088FA01FF9975 | Solution | Operations to retrieve, create and update solution details | Data Access | CSI: Customer Service Inventory | DBOR | View |

[ Search Again ] — 318

FIG. 4A  400

| Home | Search | Publish | Admin. |

Service Details ❓

Service — 402                                                                 406  ▷ Edit

| EA Domain: | Data Access | EA Subgroup | CSI: Customer Service Inventory | Host System: | DBOR | Target/Phase: | Target |

| Service Name: | Activity | | Version: | | Service ID | 3F8458003821IDA9580A72F16DCD32E |

| Service Description: | Operations to retrieve, create and update Activities and activity details |

Comments:

| Defined By: | Joanne Esposito Tue Aug 02 18:21:30 UTC 2005 | 404 | Last Modified By: | Joanne Esposito Tue Aug 02 18:21:30 UTC 2005 | 412 | 414 ▷ Edit |

Operations

| Operation Name — 408 | Operation Description — 410 | Target/Phase |
|---|---|---|
| deleteActivity | End Dates an Activity | Target |
| deleteActivityGroup | End Dates an Activity Group | Target |
| getActivityFor ComponentInstance | Returns list of activities for a specific piece of inventory. can filter output by activity status(pending, provisioned, etc.)and Activity dates (submitted, completed, etc.) | Target |
| getActivityDetails | Returns list of attributes of an Activity include related Product Attributes | Target |
| getActivityPackage | Returns the Activity with all attributes and associated Component Instance with all attributes | Target |
| getAuditTrailByActivity | Returns list of modifications to an Activity with associated details – user, date, time, F125 | Target |

Home Page

Service APIs

This is the home page for the API specification of services deployed an companies internal service delivery and maintenance platform See: Description

| Service Domains | |
|---|---|
| Billing Services | Billing and Account Management |
| Data Access | Data Services including Sales to Order DB, Network Asset inventory, Customer Service. |
|  | Inventory and Billing and Contract inventory |
| Finance | Financial Services such as Credit Check and Credit Authorization. |
| Infrastructure | Base services including publish-subscribe eventing, authorization and service logging. |
| Orchestration | cross domain archestration, activity tracking and provisioning manager orchestration. |
| Ordering | Order data gathering and validation gateway services. |
| Provisioning | Provisioning factory APLs covering L1, L2/3, L4 and other provisioning factories |
| Sales and Marketing | Solution design price, propose and contract services. |
| Service Assurance | Ticketing, testing and performance services. |

Overview  Services  Deprecated  Index  Help  Next  Frames

Comments: email us

FIG. 6

Service Page — 600

Credit Card Authorization Service

Provides credit card authorization services. Verifies cardholder's account and credit limit. Does not perform sattlement not billing See: Description

| Supported Middlewares | | ← 602 |
|---|---|---|
| CORBA | Click for CORBA Clients and IDL | |
| Web Services | Click for Web Services Clients and WSDL | |

| Inerface Summary: CORBA | | ← 604 |
|---|---|---|
| ProcessData | authorize (in ProcessData input)<br>Authorizes credit card info supplied in input | |
| String | responseCode (in String code)<br>Return the string associated with the supplied ISO response code. | |
| String | avsCode (in String code)<br>Return the string associated with the supplied address verification service code. | |
| ProcessData | pingLevel (in String level)<br>Invokes and internal test of the service to the depth (i.e., thoroughness) specified | |

| Events Generated | | ← 606 |
|---|---|---|
| none | | |

| Host System | | ← 608 |
|---|---|---|
| INRP | Description of INRP. | |

FIG. 8

Home | Search | Publish | Admin.

Edit Service ⓘ

Service Name: Plan Subscription Management ~802

Operations in Current Service ~804

| Select One | Operation Name ~806 | Description ~808 |
|---|---|---|
| ○ | addNewPlanSubscription | This transaction can be used only if there are no other plans subscribed on that hierarchy. Pricing Plan and Rate are the min. plans that needs to be subscribed. there is a max of 3 plans, which can be subscribed using this transaction. |
| ○ | disassociateBillingCustomers | Associates a single commitment across customers |
| ○ | associateCommitmentAcrossBillingCustomers | Disassociate commitment from customer |
| ○ | maintainPlan | Adds and modifies plans to hierarchies where there already are plans subscribed. |
| ○ | removePlan | removes plan from billing acount |
| ○ | setBillerRates | Translate and load pricing plans in biller |

Select an operation from the current service in the table above and then select an operation from the list of operations in Target services in the table below. press connect to establish the relationship.

Operations in Target Service(s) ~810

| Select One | Target Service ~812 | Operation Name ~814 | Description ~816 |
|---|---|---|---|
| ○ | Billing Hierarchy Management | associateBillingCustomer | Returns list of billing account ids, types and linkages |
| ○ | Billing Hierarchy Management | consolidateBillingCustomers | Moves 2 billing hierarchies under one customer |

FIG. 9

900 — Home | Search | Publish | Admin.

Edit Operation for Service: Activity ⓘ — 902

Service Name:
* Operation Name: Activity — 904
  deleteActivity — 906
* Operation Description: End Dates an Activity — 908

| 910 Delete | 912 *Param Name | 914 *Param Type | 916 *Param Description | 918 *Date Domain | 920 Param URL |
|---|---|---|---|---|---|
| ☐ | Activity ID | in | Unique key associated with the activity | CSI: Customer Service Inventory ▾ | |
| ☐ | Status ID | out | Status – Complete, in Progress, Failed | CSI: Customer Service Inventory ▾ | |

922 Submit    924 Cancel

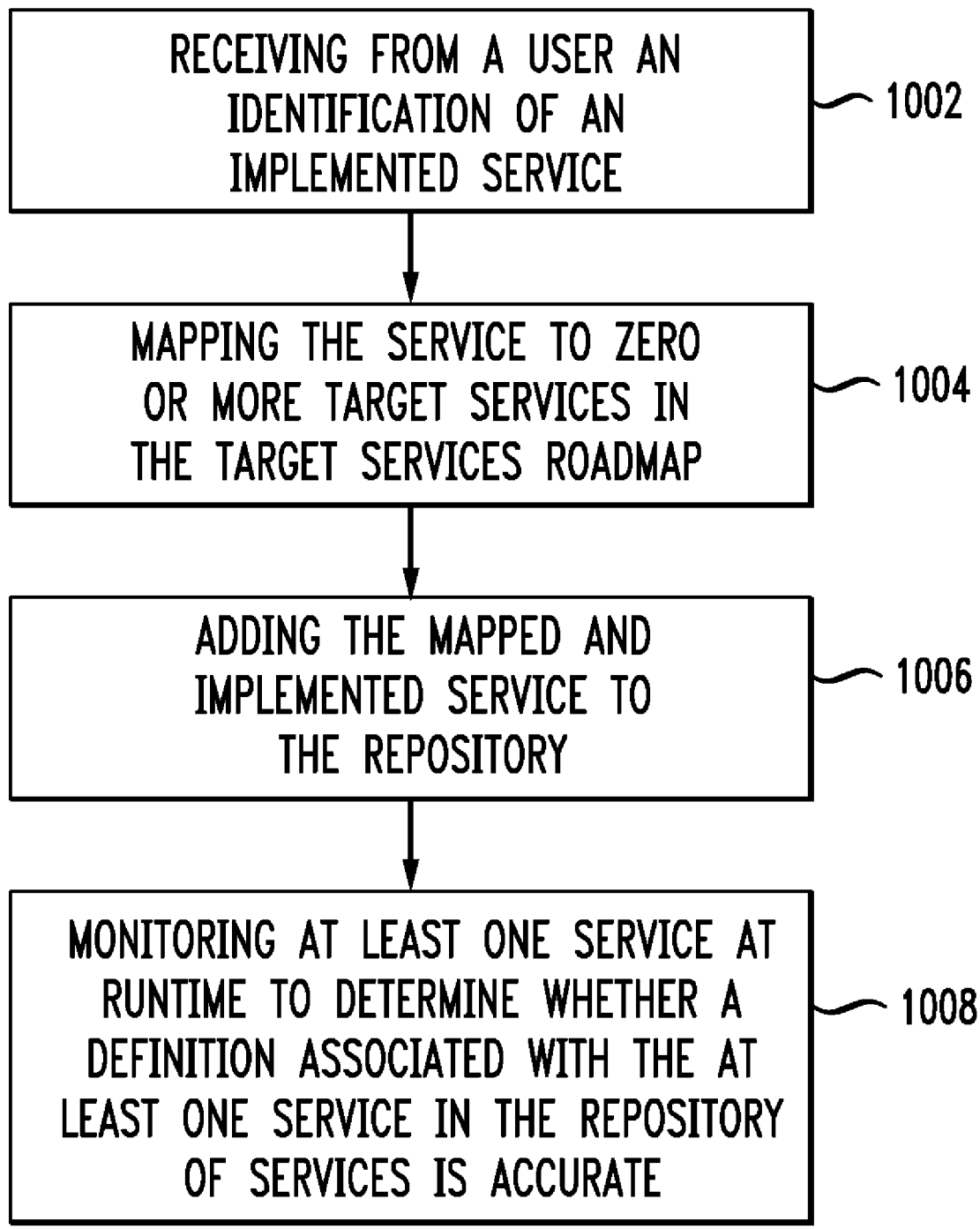

1

METHOD OF GENERATING A SERVICES REPOSITORY USING A TARGET SERVICES ROADMAP

RELATED APPLICATIONS

The present application is related to the following group of applications: U.S. patent application Ser. No. 11/322,141 filed after the present application on Dec. 29, 2005 and U.S. patent application Ser. Nos. 11/275,228; 11/275,229; 11/275,230; 11/275,232; and 11/275,234 filed on the same day as the present application, the contents of which are incorporated herein by reference.

BACKGROUND OF THE INVENTION

1. Field of the Invention

The present invention relates to service oriented architecture (SOA) and more specifically to an abstract SOA repository.

2. Introduction

Service-Oriented Architecture (SOA) is becoming a popular architecture for managing various services offered through a computer environment. Most organizations such as businesses or the government provide services to customers, clients, citizens, employees, or partners. As an example, bank tellers provide services to bank customers. Different tellers may offer different services, and some tellers may be specifically trained to provide certain types of services to the customer, such as account management, car loans, withdrawals or deposits and so forth. Several tellers may offer the same set of services to provide load balancing and high availability. What happens behind the counter does not matter to the customer, as long as the service is completed. Processing a complex transaction may require the customer to visit several tellers and therefore implement a business process flow.

Behind the counter are the information technology (IT) systems that automate the bank's services. The services are provided to the customer via the tellers. The services implemented by the IT systems must match and support the services provided by the tellers. A consistent approach to defining services on the IT systems that align with business functions and processes makes it easier for the IT systems to support the goals of the business and adapt more easily to providing the same service through humans, ATMs, and over the Web.

The same service provided by the tellers can be accessed from customers at the ATM, tellers on the office network, or Web users from their PCs. The services are designed and deployed to match the services that customers need. The implementation environments for the services do not matter in that the service is the focus. Two services can easily be combined to create another service, such as how the withdrawal and deposit service are composed into a transfer service.

The definition of software services aligns with the business services that a bank offers to ensure smooth business operations and to help realize strategic goals such as providing ATM and Web access to banking services in addition to providing them in the branch office.

More complex applications can be composed from services, such as processing a purchase order or an insurance claim. Deploying services in the context of an SOA makes it easier to compose services into simple or complex applications, which can also be utilized as services that can be accessed by humans and IT systems alike.

A service-oriented architecture is a style of design that guides all aspects of creating and using business services from conception to retirement. An SOA is also a way to define and implement an IT infrastructure to allow different applications to exchange data and participate in business processes, regardless of the operating systems or programming languages underlying those applications.

An SOA can be thought of as an approach to building IT systems in which the organizing principles are the functional services that IT systems expose to each other, or more abstractly, that functional domains within the enterprise expose to other functional domains. In contrast, earlier approaches to building IT systems tended to replicate the same functionality across different interfaces either within the same system or across different systems. They also did not adopt a common interoperability strategy that would enable an exposed service to be reused by all other endpoints. One characterization of the result of the traditional way of developing IT systems is an "accidental architecture," which is a gradual accretion of replicated system and application functionality interconnected with diverse middleware. An IT infrastructure that evolves into an accidental architecture misses the primary aim of architecture—which is to break down complicated problems into simple pieces and eliminate or reduce complexity to make construction and maintenance easy.

Businesses can obtain a competitive advantage by successfully implementing an SOA using a common interoperability strategy because there is more reuse of service functionality, less reinvention of the wheel and less need for testing, greater ability to compose solutions by aggregating existing services, and greater focus on and understanding of key enterprise services. These advantages enable them to react more quickly to changing business requirements than businesses who are still replicating service functionality on an as-needed basis, to the middleware and implementation preferences of the project de jour. These advantages also provide them with a better return on IT investments.

A common interoperability strategy work works across all execution environments within the enterprise is integral to successful SOA initiatives. It provides the ability to interconnect different execution environments, clearly separating the service interface from the execution technology, allowing IT departments to choose the best execution environment for each job and tying them together using a consistent architectural approach. Previous implementations of SOA were based on a single execution environment technology.

The idea of separating an interface from its implementation to create a software service definition has been well proven in J2EE, CORBA, COM, and DCE. But the ability to more cleanly and completely separate a service description from its execution environment is an additional feature of SOA. One way to do this is to compile implementation-agnostic interface description files into native interfaces by leveraging compilers developed for each native execution environment. Some highly interoperable technologies, such as Web Services are text based middlewares that lose performance in the conversion to binary execution environments. However, in many cases, the performance issue is less important than achieving interoperability. Other less universally interoperable technologies, such as CORBA, are binary middlewares that operate with very high performance. Typically, an interoperability strategy must support a number of middlewares to satisfy all use cases. Key is the ability for a service exposed according to the common interoperability strategy to be consumable by all endpoints within the enterprise. The greater separation of interface from execution environment in SOA facilitates the separation of work responsibilities as well. Separating the service function from its technology implementation means that businesses can think about and plan IT investments around the realization of operational business considerations, as represented by the service description, more so than the capabilities of any individual product or software technology chosen to execute the function. In this case, the service description becomes the definition of a reusable business function that all enterprise endpoints can consume.

The advantages of SOA are achievable if businesses stay focused on defining and developing reusable Concept-of-One$^{SM}$ services. Concept-of-One$^{SM}$, in this context, means that service functionality is generalized so that there is one service for each function, rather than multiple variations of the same function spread across an ever expanding ser of services. An important early step toward realizing the advantages of SOA is to define a target services roadmap that carefully organizes and plans out enterprise services to be developed. This strategic exercise is necessary to ensure that high-quality general-purpose and highly reusable services will be created, as opposed to highly customized one-off services that serve the needs of one tactical project only. This roadmap will evolve over time, but it is necessary to guide the execution of tactical teams building functionality for specific projects. With the guidance of the target services roadmap, implementation teams operating in parallel will gradually build out the target vision over time.

A significant value of SOA comes at the later stages of deployment, when such a large base of target services have been implemented, that new applications can be developed entirely, or almost entirely, by composing existing services. When new applications can be assembled out of a collection of existing, reusable services, the best value for effort can be realized.

There are benefits of reusing common business services such as customer name lookup, zip code validation, or credit checking. All services are abstract units of functionality accessed via an API of some sort. There are many levels of SOA starting at the highest interfaces supporting customer interfaces to the lowest interfaces between components in a single system (e.g., between the device driver and the operating system). Basically, every interface between two layers or components can be regarding as a SOA interface where one layer or component exposes services to the other (e.g., the device driver exposes a services layer to the operating system so that the operating system doesn't have to deal with the hardware directly. Similarly each integrated circuit chip exposes an API to assembler code executing in that environment so that the assembler code doesn't have to deal directly with the complexity within the integrated circuit chip itself). In a scope that is limited to a single system, which is built entirely with Java, a Java class (e.g., an EJB) may be a good way to realize an abstract service interface. What makes an architecture service oriented is the focus on abstract services, and more specifically, general-purpose units of functionality that are reusable by all endpoints within the scope of that architecture, and not the choice of implementation technology.

Using services not only reduces the amount of deployed code, but it also reduces the management, maintenance, and support burden by centralizing the deployed code and managing access to it.

An important aspect to a successful SOA is determining the correct design and function of the services in the reusable service library, which reflects the functional behavior of the architectural scope that SOA is being applied to. At the highest levels of the enterprise, SOA focuses on service functionality serving operational business processes. The successful definition and implementation of those SOA services ensures that operational business processes can be changed quickly and easily as external environmental changes cause an organization to adapt and evolve.

Some challenges to adoption of SOA include ensuring adequate staff training, creation of the target services roadmap, governance of services that are being implemented, and monitoring, management and reporting on how implemented services are being reused and are achieving the target.

Another challenge is managing short-term costs. Where legacy systems are involved, moving to an SOA target service may require additional incremental investment beyond the traditional alternative of tweaking the legacy service. This incremental investment typically generates a substantial return over time. Building a repository that can express the abstract SOA target, while capturing the implemented services and mapping them to the target is also costly and complex and is part of the SOA infrastructure that must be deployed. Without the SOA repository, different development teams working on different projects will end up producing similar versions of the same functional services. This is typical of past practice before SOA and adds to development cost, complexity and on-going maintenance while reducing developer productivity and efficiency. Beyond the need to enter newly implemented services into the repository, another challenge is getting pre-existing services, built before the SOA program came into being, into the repository of implemented services. Like newly implemented services these services must also be mapped to the SOA target. One of the needs in the art is an improved SOA repository that is capable of defining an abstract SOA target and mapping new and existing services to it at both the service an operation levels.

Another challenge is that some applications may need to be modified in order to participate in the SOA, specifically; their interfaces may need to be upgraded to conform to the SOA interoperability standards defined for that part of the architecture.

With respect to the interoperability standards, an attempt should be made to standardize the enterprise middleware to the maximum extent possible. Multiple enterprise middlewares carry significant costs. For example, if the interoperability standards are unclear, the same interface may need to be redeveloped in different middlewares according to the preferences of different clients. Cost is required to version, patch and maintain each middleware stack at each endpoint. Bridges, adapters and tunnels may also be required to interoperate between middleware domains. While it is desirable to have a single enterprise middleware, prevailing use cases may require the enterprise to adopt different middlewares under clearly specified circumstances (e.g., when messages over 1 Megabyte must be sent, when 10 s of milliseconds is significant to middleware performance budgets or where transactional messaging must be used).

Web services usually satisfy the use cases presented by the majority of interfaces. With Web services, by compiling a WSDL interface description file to a native implementation using a Web Services toolkit. Toolkits are available for C/C++, CORBA, Java, Microsoft, MQ Series, TIBCO and other implementation environments. Due to the popularity and industry backing behind web services, packaged application vendors like Siebel and SAP often create their own Web Services interfaces. Web Services usually can't handle all the use cases presented by a complex enterprise and other technologies to complete the interoperability specification.

Many vendors have developed Universal Description, Discovery and Integration (UDDI) repositories which describe web service implementations, but SOA is a much broader concept than web services implementation technology alone. UDDI repositories do not distinguish between an abstract services target and a concrete service implementation. An abstract service may need to be implemented in multiple middlewares but UDDI repositories can only support Web Services. Other vendors have reuse repositories for arbitrary assets (e.g., software code or engineering documentation) but they are not designed to address the needs of a service oriented architecture repository either.

Accordingly, what is needed in the art to further assist and promote the implementation of SOA is an improved tool that enables one define an abstract services target, record a concrete service implementation, map the implemented service to the target, and support service definitions irrespective of the middleware technology that they may be implemented in. Furthermore, what is needed in the art is an improved way of monitoring, managing and reporting on SOA services.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention comprise various embodiment associated with the basic concept of building a repository of services using a target services roadmap. The embodiments include, but are not limited to, a method, computer readable media, a system or computing device, a repository created using the method, a wizard for interacting with the user to populate the repository and an application that interfaces with a repository to provide services to users. The method embodiment comprises receiving from a user an identification of an implemented service and zero or more target services and mapping the implemented service to the zero or more target services. In this manner, a repository of services can be generated and built in an organized and efficient manner. Mapped services are added to the repository. Further, once the repository is built, metrics can be tracked to insure that the services defined are up to date and current.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example interface showing service search results;

FIG. 4A illustrates a portion of an example interface for service details;

FIG. 5 illustrates an interface for managing service domains;

FIG. 6 illustrates a service page for a credit card authorization service;

FIG. 8 illustrates an example interface for editing a service;

FIG. 9 illustrates an edit operation for a service; and

FIG. 10 illustrates an example method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The embodiments of the invention include, but are not limited to, a system, a computer-readable medium, a method for building a repository of service, an application that uses services from a repository of services generated according to the principles set forth here, a wizard programmed to interact with a user to generate the repository of services and a repository of services built as set forth herein.

Figure 1:
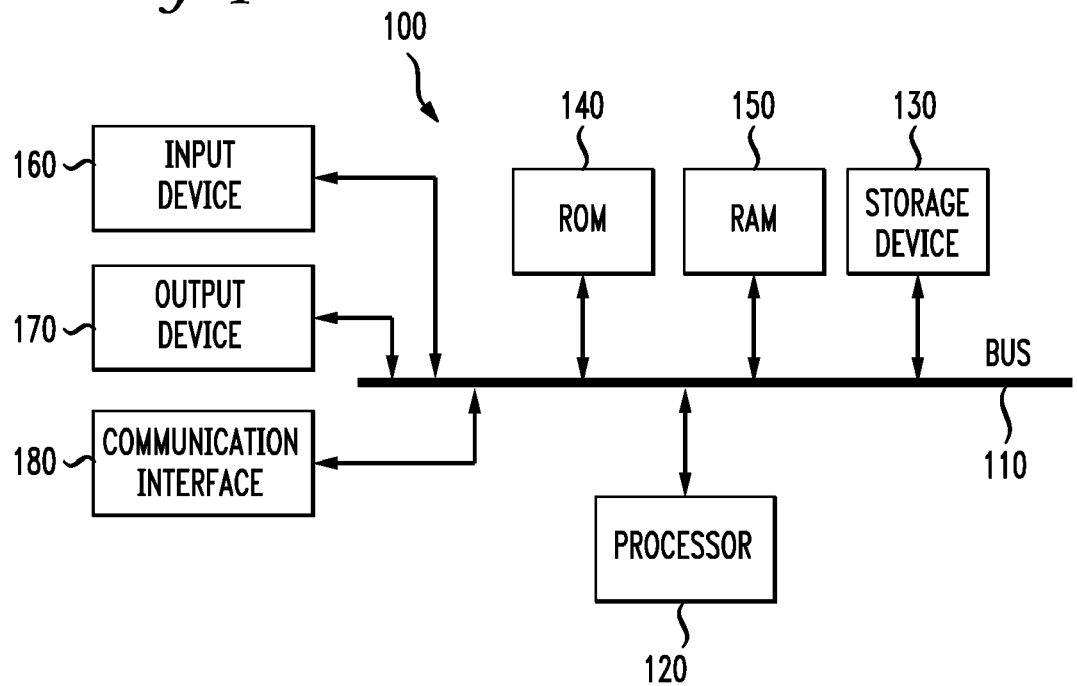
FIG. 1 illustrates an example system embodiment of the invention.

FIG. 1 illustrates the basic components of a system embodiment. With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 160 represents any number of input mechanisms, such as a microphone for speech, a touch-sensitive screen for gesture or graphical input, keyboard, mouse, motion input, speech and so forth. The device output 170 can also be one or more of a number of output means. In some instances, multimodal systems enable a user to provide multiple types of input to communicate with the computing device 100. The communications interface 180 generally governs and manages the user input and system output. The basic hardware components may be involved in implementing the application that uses the repository, developing and building the repository, providing a computing device to store or transmit the repository and so forth.

The basic principles of the invention relate to building a repository of services and more specifically to building an SOA repository. Regardless of the technology with which it is implemented, every service has a well-defined, abstract interface, often called a service contract, that clearly defines what the service does and separates the service's external accessible interface from the technical implementation. Industry experts will then labor to translate these service contracts into some extraction that is meaningful to a particular implementation environment. WSDLs, IDLs and other interface artifacts are associated with abstract service definitions, depending on the type of middleware(s) that are relevant to the service being described. Both target and implemented services are described abstractly in the repository and may be associated with these more concrete interface artifacts, and also with client specific interface agreements (which often describe "non-functional" requirements such as capacity, performance, loading, etc.).

The service-oriented architecture repository describes both target and implemented services abstractly, and places them within a taxonomy of domains and subgroups to enable easy comprehension and retrieval of service definitions. The target services roadmap is defined outside the context of any particular implementation project and describes the target set of services that enterprise wishes to implement over time. By providing the target services roadmap view, diverse implementation teams working in parallel on different projects are enabled to search, find and incorporate target services, in whole or in part, into their designs and product architectures. As they implement these services, they map each implemented service back to the target services from which it was derived. Once an implemented service has been defined, it may be viewed and specified for re-use on new feature and product solutions.

One of the challenges with the use of service contracts is that developments may move ahead and simply generate a large number of service contracts which can lead to an accidental architecture as discussed above. The repository does not evolve in an organized and planned way. Where different project teams may be working on the same application there may be overlapping of work or discontinuities in requirements that result in the creation of similar but different service implementations. This need led to a new strategy for developing a repository of services that applies to an SOA repository.

One aspect of the invention involves creating a target set of services otherwise known as a target services roadmap, and entering it into the repository. This target services roadmap describes what the architects want to eventually build out over time, across the enterprise. Conceptually this may be comparable to a puzzle where the picture of the puzzle (i.e., the complete set of services) is identified in advance as a target and its various pieces are the individual services and their service-operations. All of these services are organized into a taxonomy of domains and subgroups for easy comprehension, assimilation and searching. As implementation projects need to develop specific product and feature functionality, they find the right target functionality (i.e., the right puzzle pieces) by searching the repository. In this way, multiple teams, operating in parallel are able to collectively construct a common target picture over time, in an organized and efficient fashion. However, for various reasons, the services implemented by project teams, may not match the target services one hundred percent. (For example, a target service might have a dozen operations but a given project team initially implementing that service may only have the need to implement three of them). By mapping implemented services to the target, the organization can assess progress toward meeting the SOA goals, and can modify the target if necessary. By monitoring progress, correction can be made and work can be focused to keep the organization on track toward the SOA target.

The basic method embodiment of the invention is illustrated in FIG. 10, which shows the steps of building a repository of services using the target services roadmap. The method comprises receiving from a user an identification of an implemented service (1002) and mapping the service to zero or more target services in the target services roadmap (1004). Note that this view of the method assumes that the target services have already been identified, received and entered into the repository. The implemented service is added to the repository (1006). Other example steps include monitoring at least one service at runtime to determine whether a definition associated with the at least one service in the repository of services is accurate (1008).

The mapping is preferably performed based on a functional correspondence. Further details that are related to this process, interfaces for user interaction with a system to practice the method as well as other embodiments of the invention are discussed below.

An aspect of the invention is the concept of defining the target roadmap for a repository such as an SOA repository. As implemented services are identified they are mapped back to the target roadmap. Implemented services refer to services in any of the services phases, such as development, production and deprecation (or to be deleted). These phases are changeable and expandable through administrative screens. With this basic concept, there are also a host of other complimentary processes such as tracking metrics are the percentage and quality of the completed target roadmap by various parameters such as by system, application or domain. Management of the growth and development of the repository and so forth may be tracked through such a system.

The complimentary patent application incorporated above relates to these features with the SOA dashboard (U.S. patent application Ser. No. 11/322,141). The SOA dashboard is associated with the target services, and roadmap for managing data that is collected at runtime with data stored in the repository to report on at least one of: service operation characteristics and service-oriented architecture program effectiveness including target services offered by applications and domains, implemented services offered by applications and domains, percent of target services complete and amount of service reuse by service and domains.

The target roadmap is defined within an arbitrary taxonomy that makes sense for the architecture or enterprise to which SOA is being applied, so that target services may be filed and found according to taxonomy parameters such as billing, data access, finance, etc that users can relate to. Both implemented services and target services are associated with the same arbitrary taxonomy. A user can set up any taxonomy they desire. The system supports a flexible two-tiered hierarchical taxonomy as well as a four level taxonomy established by eTOM. Within the flexible two tiered taxonomy, a domain taxonomy parameter (e.g., billing), may have zero or more subgroup taxonomy parameters (e.g., contract, account management, etc). Any kind of hierarchical taxonomy "buckets" that is desired may be specified for this flexible taxonomy. As stated above, the target services architecture creates services within the buckets defined by this taxonomy. Implemented services will also be filed according to this taxonomy. Furthermore, there is nothing to prevent additional parameters from being associated with any given service to support filing and retrieval by alternate taxonomies (such as eTOM).

As an example, suppose a developer has an implemented service. This may be defined as a service that is already being utilized in products, that is in any stage of development or is slated for deprecation. Example services may be in the domain of banking: savings accounts, checking accounts, credit cards, loans, credit verification, etc. In the domain of a retail store, services may relate to in-store shopping, online shopping, catalog shopping, extended warranties, repairs, etc. Those of skill in the art will understand the types of services and the various kinds of services that are used and that may be contemplated as within the scope of the invention.

Users of the system will go through the steps of interacting with a wizard to identify features and parameters associated with their implemented service so it may be fully defined to the repository system including its mapping to the target service roadmap. For example, the wizard may dialog with the user to collect the service name and description and to ask if the implemented service is relates to any target service. The user can search and find, for example, that their implemented service relates to three (for example) target services. In one example, the system presents two tables, one for all operations in the three target services the user selected and the other with a list of operations in the implemented service. The user can then map one to one the operations of the implemented service to the operations of the target services. There may be an operation or an implemented service that does not map to any target services or target service operations.

Figure 2:
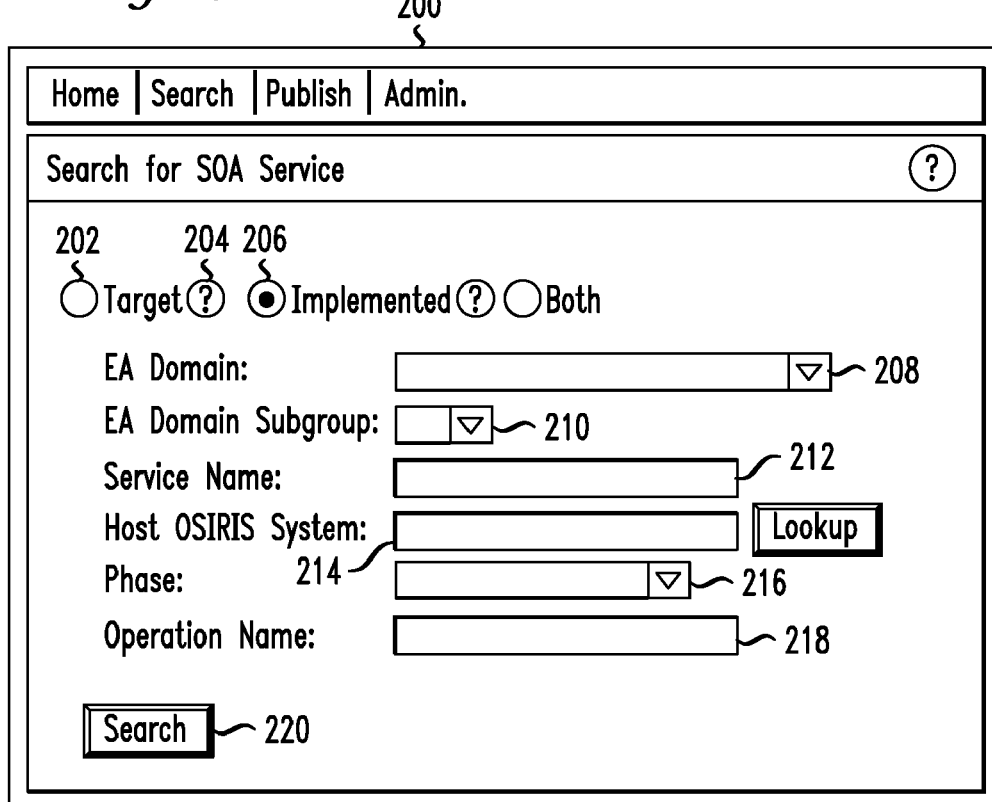
FIG. 2 illustrates an example search interface.

FIG. 2 illustrates an example search window 200 for services. Example toggle buttons include ways to search for target service definitions only 202, implemented service definitions only 204 or all service definitions 206. An enterprise architecture (EA) domain 208 search attribute includes a drop down menu for user selection of any defined EA domain. An EA domain subgroup search attribute includes a drop down menu 210 for selection of any defined EA subgroup. The user can input a service name 212 to search for, including support for wildcard expressions in the search name (e.g., "Billing*" searches for any Service that starts with "Billing"). Since services may be associated with host systems, the user can also search by a host system name212. The repository supports lookup to an external database of host systems maintained separately by the enterprise.

Another search parameter is phase 216, which is defined through administration screens and may be selected by a user from a drop down menu. Phase applies only to implemented services and describes their lifecycle (e.g., in development, production, deprecated, etc. . . . ). Additionally, the user may search by operation name 218. Like Service Name, this parameter supports wildcard expressions. With the entry of these or similar types of input, the user can click a search button 220 and a table of services meeting the search criteria is prepared automatically for the user.

FIG. 3 illustrates an example of a window 300 with search results 302 for a service search. A table is shown with the service ID 304, service name 206, service description 308, EA domain 310, EA domain subgroup 312 and host OSS system 314. A view button 314 enables the user to see more details for the particular service and a search again button 316 brings the user back to another search window.

If the user selects the view button 314, a window similar to FIG. 4A is shown. This window 400 shows an example of what may be presented to the user for service details. FIG. 4A shows a portion of the scrollable window 400. High level details about the service are shown in window 402 such as EA domain, EA subgroup, etc. The user has an option to edit these high level details via an edit button 404. An operations listing 404 shows a table including columns for an operation name 408, operation description 410 and a target/phase 412 with an edit button 406 for editing any of these features. By clicking on the hyperlinked operation names, operation details may be viewed including operation parameters. As in the high level service details above 'target/phase' can be either 'target' for a target service or one of the phases defined through the admin screens, such as 'in development', 'in production', etc. . . . . Note that a service with 10 operations may be in production with 6 operations, have two operations in development and 2 more operations that are targeted for deletion. If the service is a target service, the operation phase will be target in all cases. Also presented in the high level service details are the hyperlinked names of the persons who defined the service and who last modified the service (clicking which will pop up a window of human resources data on that individual), a taxonomy domain and subgroup within which the service was defined, the service name, service description, version, host OSS system, specification of whether the service is target or implemented, development phase if the service is an implemented service, comments and a globally unique service Id. Some of these parameters may be required parameters and some may be optional (e.g., comments).

Figure 4B:
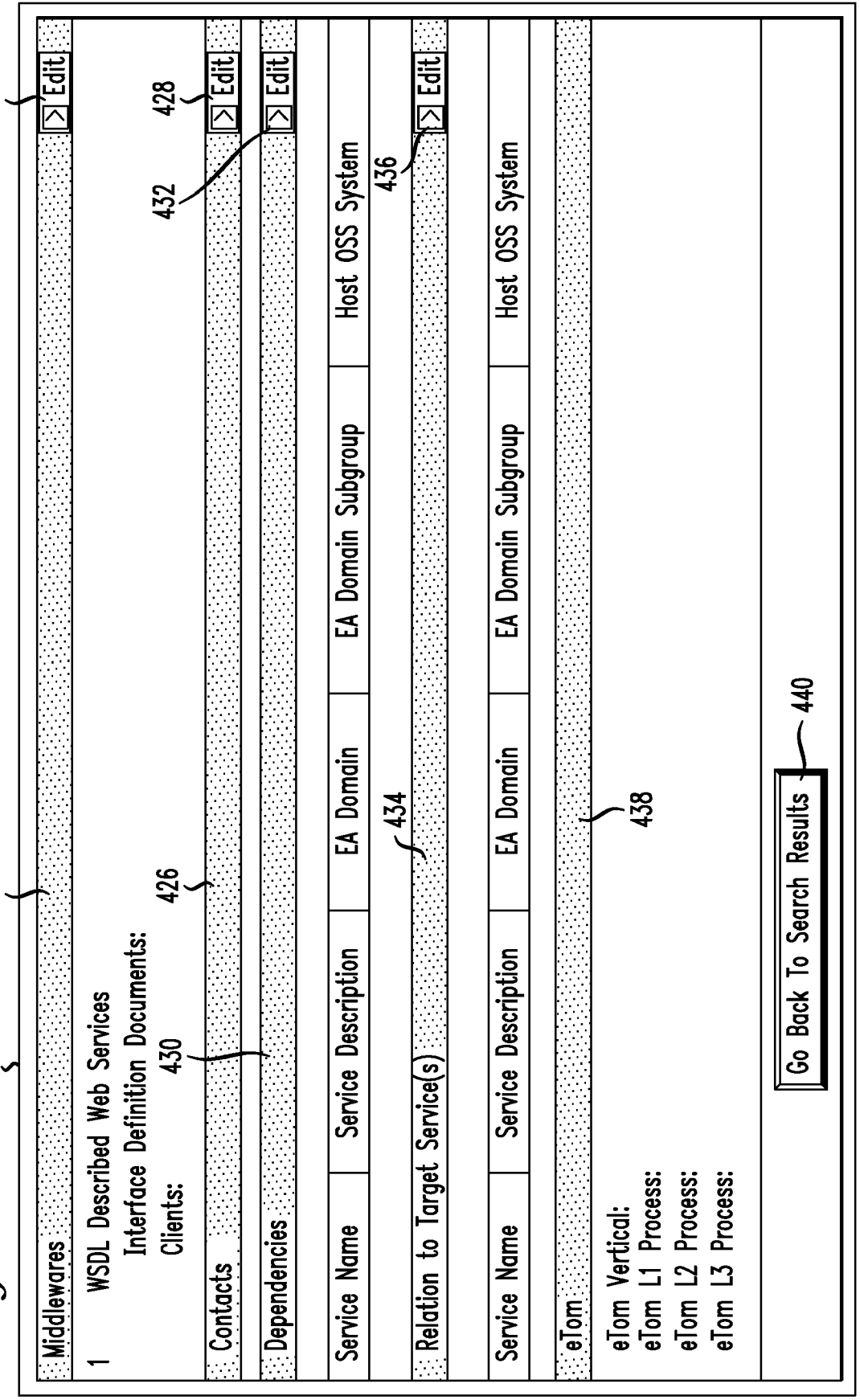
FIG. 4B illustrates a portion of an example interface for service details

FIG. 4B shows a bottom portion 420 of window 400 and includes a listing of middlewares 422 associated with the service with an opportunity to edit 424 the middlewares. Middlewares are selected from a drop down list of middleware types defined through an admin screen. They also support entry of 'other' middlewares, which must be called out by a middleware name string. A service may be associated with multiple middlewares. That is, some clients of the service may use one middleware (e.g., Web Services) while others use another middleware (e.g., CORBA). Associated with each middleware are zero or more interface definition documents (e.g., WSDL or IDL) which may be uploaded or associated by hyperlink. Once the middleware is defined, the clients (per middleware) are defined. The clients are associated with associated with zero or more interface agreement documents (e.g., interface agreements) which may be uploaded or associated by hyperlink. Contact information is included 426 and editable 428 as well as a listing of service dependencies 430 which is also editable 432. The user can also provide information associated with a relation to target services 434 which is editable 436. The user can also associate the service with an alternate taxonomy of eTOM attributes 438.

At least one of the listed parameters may be presented in a drop-down menu to the user for further selection of features associated with the parameter. At least one of the listed parameters may be provided as a pop-up screen to lookup information linked from other systems of record. When entering operation parameter information, a pop-up menu may enable the user to select standard data objects organized by a data taxonomy.

Target services are abstract services which do not go into production and do not have a lifecycle. Implemented services, by contract, do go through a lifecycle (i.e., Phase) and are mapped to the abstract target services. To publish a service, whether target or implemented, the user follows one or more steps. As an example, seven steps are discussed but any number of steps may be utilized to accomplish the necessary tasks. First, high level service details about the service (implemented or target) is obtained (as discussed above). The system engages in a dialog with the user to obtain the necessary input associated with the functional services. This may be done through the step by step wizard that obtains the information. An example listing comprises service name, service description, service version, host system, taxonomy, target/implemented service identification, comments. Beyond these high level details, additional steps of the wizard may collect operation details including operation name, operation description, operation phase, operation parameters including parameter name, parameter description, in/out/in-out type, required/optional/conditional parameter designation, data domain, URL linkage to a data dictionary. Beyond these operation details, additional steps of the wizard may collect information on middlewares, interface definition documents associated with each middleware (e.g., Web Services WSDLs or CORBA IDLs), client systems, interface agreements associated with each client (e.g., documents describing expectations with respect to loading and capacity), contacts associated with the service, dependent services (i.e., other services that this service is dependent on). For implemented services only, the relation to target services is defined as described above. Example options as set through the admin screens include CORBA, Connect:Direct, FTP, MQ Series, Other, TCP/IP, WSDL Described Web Services, XML/HTTP (including SOAP XML)]

The services are filed according to the arbitrary taxonomy. Taxonomies are frequently hierarchical in structure. However taxonomy may also refer to relationship schemes other than hierarchies, such as network structures. Other taxonomies may include single children with multi-parents, for example, "Car" might appear with both parents "Vehicle" and "Steel Mechanisms". A taxonomy might also be a simple organization of objects into groups, or even an alphabetical list. In current usage within knowledge management, taxonomies are seen as slightly less broad than ontologies.

With the basic introduction above, next the inventors will present details regarding SOA repository requirements. These will relate to such features as the user interface or wizard that dialogs with the user, linkage to other projects and the main requirements for new services to be added to the repository.

This application describes the requirements for an exemplary SOA services repository. The SOA services repository is designed to facilitate SOA service discovery and reuse and SOA architecture in general. Enterprise architecture (EA), through a SOA Center of Excellence or SOA Competency Center, provides top down guidance on SOA taxonomy where the taxonomy defines how to 'file' services to facilitate discovery and reuse, Service naming guidelines to enable the use of consistent service names (also facilitates discovery & reuse), service repository requirements which defines how the searchable repository stores service definitions to facilitate discovery and reuse, and SOA governance and development process requirements to support the tactical project-oriented development process challenge.

To establish the target services roadmap, SE and development partner with SOA COE architects to perform functional decomposition within domains and establish abstract service definitions. The challenge is to define services and operations with the correct level of granularity, establish services that are reusable, maintainable and flexible across products and offers with consistent naming standards for both services and operations. Operations should leverage target data objects when passing data in and out through operation parameters.

Target and implemented service information is entered into the SOA Repository via a user interface. The repository system validates the entered information. For both target services and the implemented service, the validation process involves validating a form associated with receiving from the user information associated with either a target service or an implemented service.

Steps that also may occur with respect to processing the input information about a service in preparation or part of the process of mapping to target services. For example, the system may determine whether the implemented service name has the same name or a similar name as a target service within the same part of the taxonomy. If the implemented service name has the same or similar name as the target service within the same domain and subgroup, the method involves confirming with the user that the implemented service is an instantiation of the same named target service, otherwise a name change is required. Then the system maps the implemented service to zero or more additional target services upon user confirmation.

The services repository is a web-based repository of SOA service definitions accessed at design time. Target architects will enter the target services for their architectural domains into the SOA repository. Engineers and feature architects consult the SOA repository to understand what services they should be building out in their features, and what already-built services they can reuse. Developers will enter production services into the repository as they enter development and go live.

The service definitions in the repository are abstract service definitions, which are mapped to specific host and client systems and to specific middleware bindings and interface artifacts used by those clients. The services repository provides a GUI that enables updating, inserting and deleting any services entry. The services repository enables searching for services by at least one of EA domain, subgroup, service name, operation name and phase as defined above. As previously described some form of wildcard name search is possible. In addition a folder based search shall be provided in future (wherein a frameset of expandable and contractable domains and subgroups controls the presentation of clickable services on another frameset). The service repository GUIs may be developed in any manner, such as being developed for internal company use only or for public use. Standard login credentials are used to gain access to the Repository at an appropriate level of privileges. When changes are made to the repository, the HRID of the person making the change is recorded.

FIG. 5 illustrates an example service repository GUI including a window 500 representing a home page for the API specification of the services deployed and a table 502 of service domains. Other features are shown as well. The format and organization is illustrative only and is not required.

FIG. 6 illustrates a credit card authorization service information page 600 that includes a listing of supported middlewares 602, an interface summary: CORBA 604, and various parameters associated with the service. In order to define a new service, users must minimally provide at least one of a service name, host system, service description and phase. The service repository shall subsequently assign a unique service ID that shall remain invariant across changes to these fields. This service ID will also remain invariant across domain name changes. It should be a short identifier because it needs to be incorporated in the runtime service log of management information.

The service description may be limited, for example, to be between 20 and 1024 characters long (or any other range) and should not contain the service name within it to avoid descriptions that add no additional information. The interface for enabling the user to insert and update service names preferably includes the following features. It should not contain any host system names or acronyms (which would imply a one-off point-to-point interface), but rather should be named according to the service function. Guidance should be provided advising users to avoid naming services with acronyms or proper names that will not make sense to those outside the project team. Guidance should be provided advising users follow the prevailing naming conventions (e.g., breaking service names into optional subfields ordered as follows: Product/DB followed by function/object followed by activity).

Operations shall be associated with one and only one service ID. In order to define a new operation, users shall access a screen that prompts for the operation name and operation description. The service repository shall subsequently assign a unique operation ID that shall remain invariant across operation name and description updates. The operation description preferably shall be between 20 and 1024 characters long and must not contain the operation name within it. Like the service Id, the operation ID should be short because it needs to be incorporated in the runtime service log. The service and operation ID is preferably composed of 8 numeric or 5 alphanumeric characters. Dropdowns, parameters, operations and services shall be rationally sorted and online help shall be provided.

Figure 7:
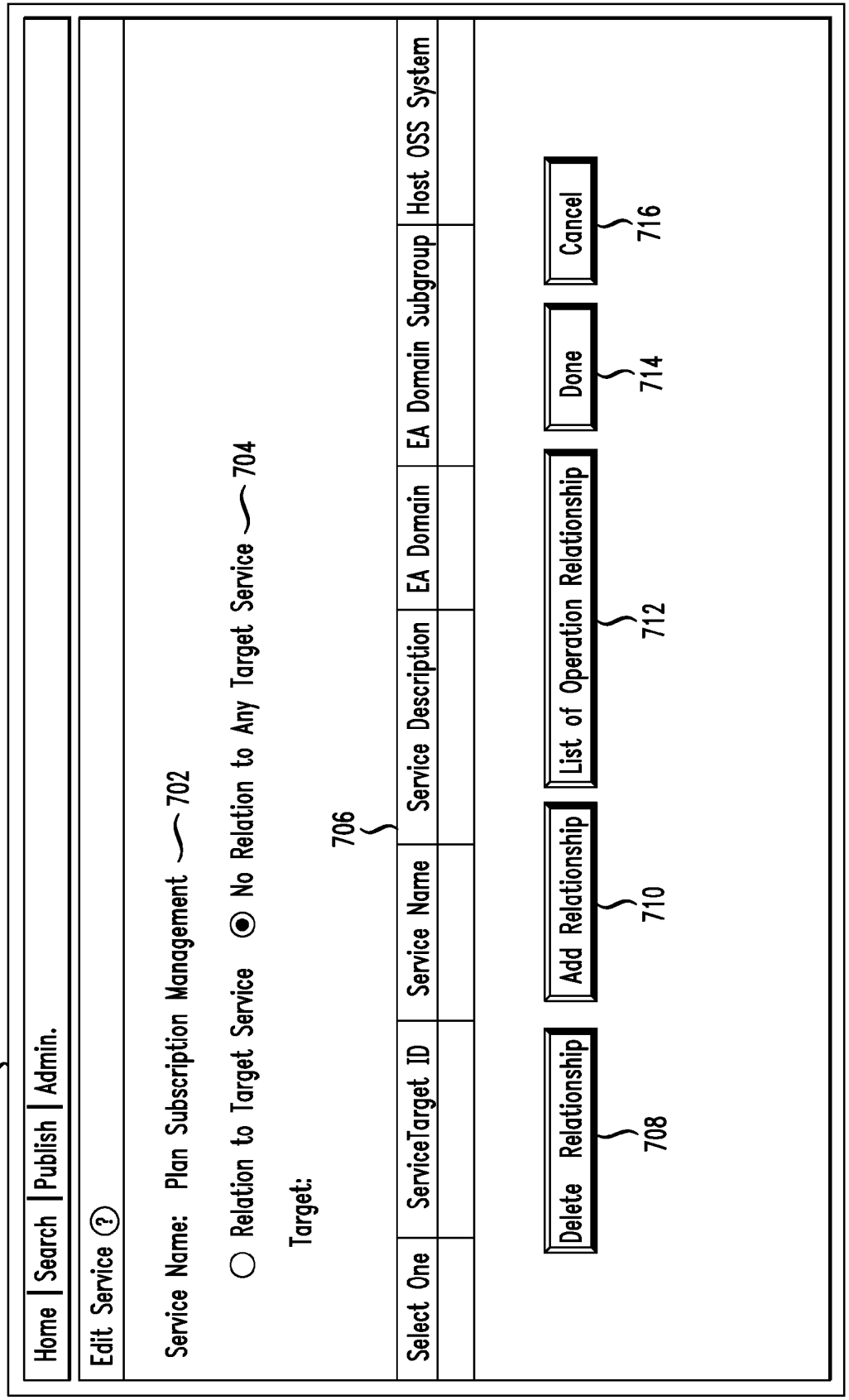
FIG. 7 illustrates an example interface for editing a service.

FIG. 7 illustrates an example edit service interface 700 with options to identify the service name and whether the service has a relation to target services or no relation to target services 704. A group of targets are listed in a table 706 with features such as service target ID, service name, service description, EA domain, EA domain subgroup and host OSS system. The user can then delete a relationship 708, add the relationship 710, obtain a list of operation relationships 712, or to select to be done 714 or cancel 716. The system through an interface can receive edits of one or more implemented service or target service associated with the target services roadmap.

FIG. 8 illustrates another aspect of editing a service through an interface 800. The example service name being edited is a plan subscription management service 802. The user selects from the table 804 preferably one (or more in another aspect) of operations associated with the current service. The operations are listed with an operation name column 806 and a description of the description 808. Next the user selects an operation from the current service in the table 804, and then the user selects from the list of operations in target services in the table 810. Table 810 lists operations associated with a target service column 812, an operation name column 814 and a description column 816. This figure shows two operations tables, one for a current service and one for target services. Once the user has identified all target services that their service (such as implemented service) their service is related to, the system automatically prepares a table of operations which comprises the union of all the operations in the target services they selected. This is what is shown in table 810.

FIG. 9 illustrates an interface 900 associated with an edit of an operation 902 for a service called "activity" 904. There is shown an example of an operation name 906 and an operation description 908. A table has columns for enabling a user to delete 910, a field for a parameter name 912, a column for a parameter type 914, a field for a parameter description 916, a data domain column 918 and a parameter URL 920. The system provides an option to submit 922 and cancel 924.

Now the disclosure turns to provide information about linking to other projects and information associated with the repository requirements. The services repository preferably uses host system identifiers (called OSSIDs) as foreign keys to link to an external host systems repository, when host and client systems are specified. It is acceptable to use a local replica of external host system information, which is updated nightly. If a host or client system is not listed in the external database of host information, the SOA services repository shall assign its own ID to the system, which must minimally be identified by name. It is possible to subsequently run reports against the services repository database to identify services that have system identifiers that are not linked to the external database of host systems. Additionally, the SOA services repository shall be linked to the runtime service logger and shall be able to display metrics on frequency of use by client and service dependency information. The requirements for this capability shall be described in the SOA dashboard requirements. See the application incorporated by reference above for more information about the SOA dashboard.

Regarding the processes of monitoring and logging the run-time system, monitoring parameters may be associated with at least one of: the service, operation clients, versions, middlewares and host systems and determining whether there are discrepancies between the monitored parameters and definitions in the repository to find discrepancies. Monitoring service and operations implemented in arbitrary middlewares may involve embedding logging callouts in service operation implementations. The method further comprises logging callouts supported at different log levels specifying the collection of an increasing amount of management information comprising at least one of: invocation occurrences, invocation authorization failures, service operation exits and callouts to other identified service operations. Further details involve logging callouts going either directly to a centralized database of management information or going to local disk where they are subsequently processed and delivered to the centralized database of management information. Logging callouts may also involve collecting information on at least one of: the service and operation IDs invoked as defined in the repository of services, service version, service host system, calling client system, initiating principal behind the calling client system, authorization status, timestamp, type of log record, transaction ID, service exit information, and service and operation IDs called by the invoked service.

The main requirements for a repository such as an SOA repository are set forth next. For each new service, the SOA repository should minimally enable definition and edit of at least one and preferably all of the following hierarchical information unique service ID, identification of the user defining this service, EA domain, EA subgroup, eTOM vertical(s), eTOM L1 process, eTOM L2 process, eTOM L3 process, service name, service description, service version, host OSS system, target/implemented service indication, phase (for non target services), (1..n) linkage to target services, (1..n) product/offer list, and (1..n) service dependencies. Operations are also part of the hierarchical information and the repository needs to enable defining and editing of the following information: (1..n) operations consisting of a unique operation ID, operation name, operation description, operation phase, (1..n) linkage to target operations, (1..n) operation data parameters consisting of data parameter name, data parameter description, data domain of the parameter, indication of whether it is in, out or in/out, indication of whether it is optional, conditional or required, and a linkage to a data dictionary Finally service operations may be linked to (1..n) triggering enterprise events. Middlewares are also part of the hierarchical information and the repository needs to enable defining and editing of the following information: (1..n) middlewares associated with (1..n) interface definition files, (1..n) client OSS systems associated with (1..n) client interface agreement. Finally services the following information is associated with service definitions: contacts and comments.

The identification of the Engineer defining the service is a preferably a required field. The EA domain is a required field presented as a drop down list from which one value may be selected from an arbitrary list of values which may comprise such values as billing and account management, capacity management and so forth.

The EA Subgroup is a required field presented as a drop down list from which at least one value may be selected from a list of arbitrary values specific to each domain which includes the subgroups. Examples include, but are not limited to: billing and account management domain subgroups (which may include account management, bill calculation, bill rendering and usage management), capacity management domain subgroups (which may include equipment ordering, installation and test, planning, provision capacity) and so forth.

The list of domains and subgroups may be changed or made changeable to users by accessing an administrative screen, enabling edit, addition and deletion of domain and subgroup names. The above listing of EA Domains and Subgroups is an example list which may be modified using SOA repository administration tools. It shall be possible to add, edit and delete subgroups and domains from an administrative screen.

The eTOM vertical shall be settable by enterprise architecture only. It shall be an optional field presented as a drop down list from which one or more values may be selected: A for assurance, B for billing, E for enterprise management, F for fulfillment, I for infrastructure lifecycle management, O for operations support & readiness, P for product lifecycle management and S for strategy & commit. The eTOM L1 process is preferably settable by enterprise architecture only. It shall be an optional field presented as a drop down list from which one and only one value may be selected from choices within three broad categories.

The first category relates to operations and includes at least the following features: CRM for customer relationship management, SM&O for service management & operations, RM&O for resource management & operations and SRM for supplier/partner relationship management. The second category is strategy, infrastructure and products with at least the following features: M&OM for marketing & offer management, SD&M for service development & management, RD&M for resource development & management and SCD&M for supply chain development & management. The third category is enterprise management with the following features: EEM for enterprise effectiveness management, ERM for enterprise risk management, F&AM for financial and asset management, HRM for human resources management, K&RM for knowledge & research management, S&EP for strategic & enterprise planning and S&ERM for stakeholder & external relations management.

The eTOM L2 Process is preferably settable by enterprise architecture only. It is preferably an optional field presented as a drop down list from which one or more value may be selected. The possible eTOM L2 process EA subgroup values depend on the value of the eTOM L1 process as follows: CRM for customer relationship management (with the following possible features: CRM support and readiness, customer interface management, marketing fulfillment response, selling, order handling, problem handling, customer QOS/SLA management, billing & collections management and retention & loyalty), SM&O for service management & operations (with the following possible features: support & readiness, service configuration & activation, service problem management, service quality management and service & specific instance routing), RM&O for resource management & operations (with the following possible features: RM&O support & readiness, resource provisioning, resource trouble management, resource performance management and resource data collection & processing), SRM for supplier/partner relationship management (with the following possible features: S/PRM operations support & readiness, S/P requisition management, S/P problem reporting & management, S/P performance management, S/P settlements & billing management and S/P interface management), M&OM for marketing & offer management (with the following possible features: market strategy & policy, product & offer portfolio management, product & offer capability delivery, marketing capability delivery, product development & retirement, sales development and product marketing communications & promotion), SD&M for service development & management (with the following possible features: service strategy & planning, service capability delivery and service development & retirement), RD&M for resource development & management (with the following possible features: resource strategy & planning, resource capability delivery and resource development & retirement), SCD&M for supply chain development & management (with the following possible features: supply chain strategy & planning, supply chain capability delivery and supply chain development & change management), EEM for enterprise effectiveness management (with the following possible features: process management & support, enterprise quality management, program & project management, enterprise performance assessment, facilities management & support), ERM for enterprise risk management (with the following possible features: business continuity management, security management, fraud management, audit management and insurance management), F&AM for financial and asset management (with the following possible features, financial management, asset management and procurement management), HRM for human resources management (with the following possible features: HR policies & practices, organization development, workforce strategy, workforce development and employee & labor relations management), K&RM for knowledge & research management (with the following possible features: knowledge management, research management and technology scanning), S&EP for strategic & enterprise planning (with the following possible features: strategic business planning, business development, enterprise architecture management and group enterprise management), S&ERM for stakeholder & external relations management (with the following possible features: corporate communications & image management, community relations management, shareholder relations management, regulatory management, legal management and board & shared/securities management).

The eTOM L3 process is preferably settable by enterprise architecture only. It shall be an optional field presented as a drop down list from which one and only one value may be selected. The possible eTOM L3 process EA subgroup values depend on the value of the eTOM L2 process as follows. Note that not all eTOM L2 processes have L3 process decomposition. For example, the ones identified next have L3 process decomposition:

(1) CRM for Customer Relationship Management
CRM Support and Readiness
   Support Customer Interface Management
   Support Marketing Fulfillment
   Support Order Handling
   Support Selling
   Support Problem Handling
   Support Customer QOS/SLA
   Support Billing & Collections
   Manage Campaign
   Support Retention & Loyalty
Customer Interface Management
   Manage Contact
   Manage Request
   Analyze and Repot on Customer
Marketing Fulfillment Response
   Issue and Distribute Marketing Collaterals
   Track Leads
Selling
   Manage Prospect
   Qualify and Educate Customer
   Negotiate Sales
   Acquire Customer Data
   Cross/Up Selling
Order Handling
   Determine Preorder Feasibility
   Authorize Credit
   Receive PO & Issue Orders
   Track Order & Manage Jeopardy
   Complete Order
Problem Handling
   Isolate Problem & Initiate Resolution
   Report Problem
   Track and Manage Problem
   Close Problem
Customer QOS/SLA Management
   Assess Customer QOS Performance
   Manage QOS & SLA Violation Information
   Manage Reporting
Billing & Collections Management
   Manage Customer Bill Inquiries
   Apply Pricing, Discounting & Rebate
   Create & Deliver Bill
   Manage Customer Billing
   Manage Collection
   Retention & Loyalty
   Establish & Terminate Customer Relationship
   Build Customer Insight
   Analyze and Manage Customer Risk
   Personalize Customer Profile Retention & Loyalty
   Validate Customer Satisfaction
(2) SM&O for Service Management & Operations
Support & Readiness
   Manage Service Inventory
   Enable Service Configuration & Activation
   Support Service Problem Management
   Enable Service Quality Management
   Support Service & Specific Instance Rating
Service Configuration & Activation
   Design Solution
   Allocate Specific Resources to Services
   Track & Manage Work Orders
   Implement & Configure Service
   Test Service End-to-End
   Activate Service
Service Problem Management
   Evaluate & Qualify Problem
   Diagnose Problem
   Plan & Assign Resolution
   Track & Manage Resolution
   Close & Report
Service Quality Management
   Monitor Service Quality
   Analyze Service Quality
   Improve Service
   Identify & Report Service Constraints
Service & Specific Instance Routing
   Mediate Usage Records
   Rate Usage Records
   Analyze Usage Record
(3) RM&O for Resource Management & Operations
RM&O Support & Readiness
   Enable Resource Provisioning
   Enable Resource Performance Management
   Support Resource Trouble Management
   Enable Resource Data Collection & Processing
   Manage Resource Inventory
   Manage Workforce
   Manage Logistics
Resource Provisioning
   Allocate & Deliver Resource
   Configure & Activate Resource
   Test Resource
   Collect, Update & Report Resource Configuration Data
Resource Trouble Management
   Survey & Analyze Resource Trouble
   Localize Resource Trouble
   Correct & Recover Resource Trouble
   Track & Manage Resource Trouble
   Report Resource Trouble
   Close Resource Trouble
Resource Performance Management
   Monitor Resource Performance
   Analyze Resource Performance
   Control Resource Performance
   Report Resource Performance
Resource Data Collection & Processing
   Collect Resource Data
   Process Resource Data
   Report Resource Data
   Audit Resource Usage Data
(4) SRM for Supplier/Partner Relationship Management
S/PRM Operations Support & Readiness
   Support S/P Requisition Management
   Support S/P Problem Reporting & Management
   Support S/P Performance Management
   Support S/P Settlements and Billing
   Support S/P Interface Management
S/P Requisition Management
   Select Supplier/Partner
   Determine S/P Pre-Requisition Feasibility
   Place S/P Requisition
   Receive & Accept S/P Product
S/P Problem Reporting & Management
   Report Problem to S/P
   Receive & Notify Problem from S/P
   Manage S/P Problem Resolution
S/P Performance Management Monitor & Control Service Performance
Restore S/P Service Performance
Monitor S/P Performance
S/P Settlements & Billing Management
Manage Account
Receive & Assess Invoice
Negotiate & Approve Invoice
Issue Settlement Notice & Payment
S/P Interface Management
Manage S/P Requests
Analyze & Report S/P Interactions The Service Name, Description and Version are preferably required fields. Version numbers are preferably displayed and stored in the format 'v##.##' where the # symbols stand for digits from 0 to 9. Developers are preferably required to create version numbers with a format that matches the SOA Repository. Where there is an embedded base of services that do not correspond to this format, version numbers obtained from the SOA logger may not correspond to the above format and are normalized as follows: For each group of digits before and after the '.', apply the following algorithm: strip off any leading zeros and keep only the two least significant digits padding with leading zeros if necessary such that there are two digits total.

A one time conversion shall be applied to all services which lack version numbers. They shall all be assigned v01.00, unless this service name and version already exists (in the same Domain, Subgroup and Phase), in which case, each such unversioned service in that same Domain, Subgroup and Phase shall be arbitrarily assigned unused version numbers starting at 00.01 and counting up by increments of 0.01.

The Host OSS System is preferably a required field. The interface shall enable users to be able to type in a host name string and click on a 'Lookup' button, which shall display a search popup that enables them to search, by acronym or name, an replica DB of host systems which is synced up nightly with the real database of record for enterprise host systems.

When a user clicks 'Lookup', the host name string they entered shall be automatically passed into this host system Search popup as the 'Search For' string. The same wildcard search behavior that exists on the SOA repository search screen for service and operation names shall also be supported on this popup.

The host system Search popup shall also include a "System Is Not Defined" button or hyperlink that enables users to certify that the 'Search For' string is a valid system name that is not in the database of host systems. This button or hyperlink shall not be displayed until after at least one search has been run.

When 'System Is Not Defined' is clicked, the 'Search For' string shall be searched against the actual database of record for enterprise host systems. The search should fallback to the replica database of host systems only if the actual database of record for enterprise host systems is not online. If the 'Search For' string is found to be in the host system database, then it shall immediately be accepted. In that case, the search popup shall close and the 'Search For' string shall be entered into the host OSS system input box.

If the 'Search For' string is not in the database of host systems, then a confirm box pops up and warns the user: "You are about to enter a system name that is not in the host system database. To prevent data quality errors, click Cancel unless you are certain this system is not in the database of record for host systems". The Confirm Box shall include two buttons: 'OK' and 'Cancel'.

If the user clicks 'Cancel' they shall be returned to the search popup. If the user clicks 'OK' then their entry shall be accepted. In that case, the search popup shall close and the 'Search For' string shall be entered into the Host OSS System input box. In addition to that, a grayed out 'System Is Not Defined' checkbox shall be set on the Publish Service (or Edit Service) screen indicating that the system is not in the database of host systems. The only way to check and uncheck this checkbox shall be by entering a valid system or by entering a system that is not in the database of host systems, via the procedure just described.

Whether or not users click the 'Lookup' button, their entry shall be passed to a validation routine that is invoked when users submit the page of form data containing the host OSS system field. This validation routine will check the entered host OSS system against the replica DB of host systems for an exact match. If an exact match is not found, and the 'System Is Not Defined' checkbox is not set, then the validation routine shall check the host OSS system against the actual database of record for enterprise host systems (if online). If the host OSS System still does not match then a validation error message shall be displayed to the user as indicated below (along with other validation error messages): "The Host OSS System must be a valid host system acronym or the 'System Is Not In the database of host systems' checkbox must be set by running a search via the Lookup button next Host OSS System field."

It is preferable that the system does not accept an empty host OSS system string be accepted. This requirement applied to both the publish service and edit service screens.

The phase shall be a required field, which shall one of the following values: In development, production, targeted for deletion. In addition to phase, support exists for a 'Target' attribute associated with services that indicates whether they are target or not. If the service is not a target service, then they shall have a phase. If a target service, then they shall not go through phases. If a service is not a 'Target' service, then it shall be an 'Implemented' service. The system allows different versions of the same service within a domain, subgroup and phase. The system does not allow the same service name/version to be in different phases. For example: service test1 version 01.01 and service test1 version 01.02 may both be in 'Production', however service test1 version 01.01 should not both be both in 'Production' and 'Development'. This requirement specifies validation rules which apply to both the definition of new services and the editing of existing services.

When a new Implemented service is created or an existing Implemented service is edited, upon validation of the entry form, before any other validations are performed, the system checks to see if the implemented service name has the same name as a target service within the same domain and subgroup. If it does, the system requires the user to confirm that the implemented service is an instantiation of the target service. Confirmation shall be obtained via a confirm box popup which shall state: "Within a Domain and Subgroup, an implemented service can have the same name as a target service only if it is an instantiation of that target service. Is this service an instantiation of the same named target service? If you are unsure, click 'No'." The confirm box shall include two buttons: 'Yes' and 'No'. If 'No' is clicked, the user shall be returned to the entry form. If 'Yes' is clicked, then a mapping between the implemented service and the target service shall be established and the rest of the validations shall be performed on the entry form.

Similarly, when a new target service is created or an existing target service is edited, upon validation of the entry form, before any other validations are performed, check to see if the target service name has the same name as an Implemented service within the same domain and subgroup. If it does, require the user to confirm that the Implemented service is an instantiation of the target service. Confirmation shall be obtained via a confirm box popup which shall state: "Within a Domain and Subgroup, an implemented service can have the same name as a target service only if it is an instantiation of that target service. Is the same named implemented service an instantiation of this target service? If you are unsure, click 'No'." The confirm box shall include two buttons: 'Yes' and 'No'. If 'No' is clicked, the user shall be returned to the entry form. If 'Yes' is clicked, then a mapping between the implemented service and the target service shall be established and the rest of the validations shall be performed on the entry form.

In the mapping to target screens, if the user attempts to delete a mapping between two identically named services within the same domain and subgroup, a validation error message shall be provided stating: "A mapping between identically named services within the same domain and subgroup cannot be deleted unless the name of one of the services involved is changed."

The product/offer list shall be an optional field presented as a searchable list of company products and offers (to be defined), from which multiple products and offers may be selected.

The service dependencies input shall be an optional field presented as a searchable list of all services in the services repository. When selected, the EA domain, subgroup and service name shall be displayed. Multiple services shall be selectable. At least one operation is preferably required per service definition. The data domain shall be a required field whenever a data parameter is defined. It shall be presented as a drop down list with possible values: ATI: assurance and ticket inventory, BCI: billing and contract inventory, CCI: common customer identifier, CSI: customer service inventory, DSW: decision support warehouse, ECX: enterprise customer cross reference, FAW: financial and accounting warehouse, NAI: network asset inventory, NAX: network Asset cross reference and PSOC: product catalog.

The middleware is preferably a required field presented as a drop down list with possible values listed below. If other is selected, it should be associated with a user supplied string (e.g., Other: DSAP), connect direct, CORBA, FTP, MQ Series, Other, WSDL described web services, XML/HTTP.

The interface definition file shall depend on the following middlewares: CORBA requires an IDL, WSDL described web services requires a WSDL and XML/HTTP requires a schema or DTD. All others require a word document describing the interface. The interface definition file may be provided by upload or via hyperlink to a document repository.

The client OSS System shall be a required field for each middleware that was defined. It shall be presented as a searchable list of enterprise host systems. The selected acronym(s) shall be displayed.

The client OSS System shall be an optional field for each middleware that was defined. Users shall be able to type in a system name and click on a 'Lookup' button, which shall display a host system database Search popup that enables them to search, by Acronym or Name, a replica DB of host systems which is synced up nightly with the database of record for enterprise host systems.

When they click 'Lookup', the system name string they entered shall be automatically passed into this OSIRIS Search popup as the 'Search For' string. The same wildcard search behavior that exists on the SOA repository search screen for Service and operation names shall also be supported on this popup.

The OSIRIS search popup shall also include a "System Is Not Defined" button or hyperlink that enables users to certify that the 'Search For' string is a valid system name that is not in the database of host systems. This button or hyperlink shall not be displayed until after at least one search has been run.

When 'System Is Not Defined' is clicked, the 'Search For' string shall be searched against the actual database of record for enterprise host systems. The search should fallback to the replica host database only if the actual database of record is not online. If the 'Search For' string is found to be in the host system database, then it shall immediately be accepted. In that case, the search popup shall close and the 'Search For' string shall be entered into the Client OSS System input box.

If the 'Search For' string is not in the host system database, then a confirm box shall popup and warn the user: "You are about to enter a system name that is not in the database of host systems. To prevent data quality errors, click Cancel unless you are certain this system is not in the database of record for enterprise host systems". The confirm box shall include two buttons: 'OK' and 'Cancel'.

If the user clicks 'Cancel' they shall be returned to the search popup. If the user clicks 'OK' then their entry shall be accepted. In that case, the search popup shall close and the 'Search For' string shall be entered into the Client OSS System input box. In addition to that, a grayed out 'System Is Not Defined' checkbox shall be set on the publish service (or edit service) screen indicating that the system is not in database of host systems. The only way to check and uncheck this checkbox shall be by entering a valid host system or by entering a system that is not in database of host systems, via the procedure just described.

Whether or not users click the 'Lookup' button, their entry shall be passed to a validation routine that is invoked when users submit the page of form data containing the client OSS system field. This validation routine will check the entered client OSS system against the host system replica DB for an exact match. If an exact match is not found, and the 'System Is Not Defined' assertion has not be made, then the validation routine shall check the Client OSS System against the actual database of record for enterprise host systems (if online). If the Client OSS System still does not match then a validation error message shall be displayed to the user as indicated below (along with other validation error messages):

"The Client OSS System must be a valid host system acronym or the 'System Is Not Defined' checkbox must be set by running a search via the Lookup button next Client OSS System field." This requirement applied to both the Publish Service and Edit Service screens.

The client interface agreement shall be optional and may be provided by upload or link to a document repository. The contact field shall be an optional field. Users are able to type in a name or an HRID and click on a 'Lookup' button which shall display a search popup that enables them to search, by name, handle, phone, HRID or email.

When they click 'Lookup', the Name string they entered shall be automatically passed into this search popup as the 'Search For' string. If name was not entered the HRID shall be passed in. Otherwise, the 'Search For' string shall be blank. The same wildcard search behavior that exists on the SOA repository search screen for service and operation names shall also be supported on this popup.

When a search is performed, a list of names and hyperlinked HRIDs will be displayed. If an HRID hyperlink is clicked, the search popup shall close and the HRID and associated name shall be entered into the corresponding fields on the Add/Edit contact screen.

Whether or not users click the 'Lookup' button, their entry shall be passed to a validation routine that is invoked when users submit the page of form data on the Add/Edit Contact screen. This validation routine will check the entered HRID and name against the database for exact matches. If exact matches on both fields are not found then a validation error message shall be displayed to the user as indicated below (along with other validation error messages):

"The HRID and Name must be valid per the database. Please use the lookup button to find and select a valid HRID and name." This requirement applied to both the publish service and edit service screens. The comments shall be an optional field capturing at least 500 characters enabling any comments to be made by the definer of the service to the reviewers of the service. Provide a way to associate non-target services with target services at the operation and service levels.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the messages discussed above that are presented in dialogs with the user are only provided as examples and any appropriate way of articulating the information is contemplated as within the scope of the invention if referenced in the claims. Accordingly, the appended claims and their legal equivalents should only define the invention, rather than any specific examples given.

We claim:

1. A computer-implemented method of building a repository of services using a target services roadmap, the method causing a computing device to perform steps comprising:
receiving a target services roadmap for a service oriented architecture (SOA) repository, the target services roadmap comprising an abstractly-described listing of functional services and defining a group of target services yet to be identified and assimilated into the SOA repository, and which are unimplemented, wherein the listing of functional services relate to the definition of implemented services and target services consists of at least one of: service name, service description, service version, host system, taxonomy, target or implemented service identification, comments, operations including operation name, operation description, operation parameters including parameter name, parameter description, in-or-out-or-in-out type, at least one of required or optional or conditional designation, data domain, URL linkage to data dictionary, middlewares, interface definition documents associated with each middleware, clients, interface agreements associated with each client, contacts, and dependent services;
iteratively, until a SOA repository of services is complete according to the target services roadmap, performing the steps:
receiving a selection from a user via a field in a user interface of an implemented service in a SOA;
mapping the selected service to zero or more target services based on the target service roadmap; and
building the SOA repository of services including the mapped, implemented service.

2. The method of claim 1, wherein the listing of functional services further consists of at least one of: service phase, operation phase and relation to a target service.

3. The method of claim 1, wherein the taxonomy comprises a domain and a subgroup, optionally an eTOM Vertical, and at least one of Level 1 or Level 2 or Level 3 eTOM Process specification.

4. The method of claim 1 wherein the implemented service goes through phases and different versions comprising development, production and deprecation.

5. The method of claim 1, further comprising:
receiving from a user an edit of one of the implemented service or a target service within the target services roadmap.

6. The method of claim 1, wherein the step of mapping the implemented service to zero or more target services in the target service roadmap further comprises:
mapping the implemented service to zero or more target services based on functional correspondence.

7. The method of claim 6, wherein if a target service or services is specified, then the method further comprises mapping each operation in the implemented service to zero or at most one operation in the target service(s).

8. The method of claim 1, further comprising:
monitoring at least one service at runtime to determine whether a definition associated with the at least one service in the repository of services is accurate.

9. The method of claim 8, further comprising:
monitoring parameters associated with at least one of: the service, operation clients, versions, middlewares and host systems; and
determining whether there are discrepancies between the monitored parameters and definitions in the repository to find discrepancies.

10. The method of claim 8, further comprising:
monitoring service and operations implemented in arbitrary middlewares by embedding logging callouts in service operation implementations.

11. The method of claim 10, further comprising:
logging callouts supported at different log levels specifying the collection of an increasing amount of management information comprising at least one of: invocation occurrences, invocation authorization failures, service operation exits and callouts to other identified service operations.

12. The method of claim 11, further comprising:
logging callouts going either directly to a centralized database of management information or going to local disk where the callouts are subsequently processed and delivered to the centralized database of management information.

13. The method of claim 12, further comprising:
logging callouts collecting information on at least one of: the service and operation IDs invoked, service version, service host system, calling client system, initiating principal behind the calling client system, authorization status, timestamp, type of log record, transaction ID, service exit information, and service and operation IDs called by the invoked service.

14. The method of claim 1, wherein the implemented service and a target service associated with the target roadmap are associated with a dashboard of management information combining data collected at runtime with data stored in the repository to report on at least one of: service operation characteristics and service-oriented architecture program effectiveness including target services offered by applications and domains, implemented services offered by applications and domains, percent of target services complete and amount of service reuse by service and domains.

15. The method of claim 1, wherein the implemented service and target services associated with the target services roadmap are associated with an arbitrary taxonomy.

16. The method of claim 1, wherein the implemented or target service is defined by specifying at least one of: the HRID of the person defining the implemented service, a taxonomy domain, a taxonomy subgroup, an optional eTOM taxonomy, a service name, a service description, a version, a host OSS system, a specification of whether the service is a target service or implemented service, a development phase if an implemented service, contacts, comments, one or more operations including operation data parameters, one or more middlewares and associated interface artifacts, clients and interface agreements.

17. The method of claim 16, wherein, when defined, globally unique service and operation IDs are assigned for target services and/or the implemented service.

18. The method of claim 16, further comprising presenting options to the user to edit any of the entered information associated with the implemented service and target services.

19. The method of claim 16, wherein at least one of the listed parameters provides a drop-down menu to the user for further selection of features associated with the parameter, and at least one of the listed parameters provides a pop-up screen to lookup information linked from other systems of record.

20. The method of claim 1, further comprising validating received information from the user for the implemented service.

21. The method of claim 1, further comprising:
for both target services and the implemented service, validating a form associated with receiving from the user information associated with either a target service or the implemented service.

22. The method of claim 1, wherein the method further comprises:
determining whether the implemented service name has the same name as a target service within the same part domain and subgroup taxonomy.

23. The method of claim 22, wherein if the implemented service name has a similar name as the target service within the domain and subgroup taxonomy, then confirming with the user that the implemented service is an instantiation of the same named target service.

24. The method of claim 23, wherein the mapping of the implemented service to zero or more target services is performed upon user confirmation.

25. The method of claim 16, wherein the following list of parameters associated with the implemented service are optional parameters: comments, additional contacts and dependencies.

26. The method of claim 25, wherein the following additional list of parameters associated with the implemented service is optional: operations, middlewares and clients.

27. The method of claim 16, wherein receiving a definition of the domain parameter further comprises requiring the user to select one value from an arbitrary list of values, which includes the following taxonomy of domains: billing and account management, capacity management, data access, decision support, ebonding, servicing, finance, infrastructure, network and element management, other, recording management, sales and marketing, service assurance, service delivery and workcenter architecture.

28. The method of claim 16, wherein receiving a definition of the taxonomy of subgroup parameters further comprises requiring the user to select at least one value from an arbitrary list of value specific to each domain, which includes the following list: billing and account management domain subgroups, capacity management domain subgroups, data access domain subgroups, decision support domain subgroups, ebonding domain subgroups, servicing domain subgroups, finance domain subgroups, infrastructure domain subgroups, network and element management domain subgroups, recording management domain subgroups, sales and marketing domain subgroups, service assurance domain subgroups, service delivery domain subgroups and workcenter architecture domain subgroups.

29. The method of claim 17, wherein the list of domains and subgroups are changed by accessing an admin screen, enabling edit, addition and deletion of domain and subgroup names.

30. The method of claim 1, further comprising:
engaging in a dialog with the user to obtain input associated with the listing of functional services.

31. The method of claim 1, wherein the repository is a service-oriented architecture repository.

32. The method of claim 1, further comprising:
adding the target service or mapped implemented service to the repository.

33. The method of claim 31, wherein the service-oriented architecture repository places services within a taxonomy of domains and subgroups, and the method further supports the build-out of the target services roadmap by:
enabling new feature and product architectures and solution designs to view, specify and build out the service oriented target services in parallel; and
mapping each implemented service back to the target service roadmap upon completion of feature development.

34. The method of claim 31, wherein once implemented services have been defined, the implemented services are viewed and specified for reuse on new feature and product solutions.

35. The method of claim 16, wherein at least one of the listed parameters provides a pop-up screen that enables selection of standard data objects organized by a data taxonomy.

* * * * *